(12) United States Patent
Kim et al.

(10) Patent No.: US 8,032,753 B2
(45) Date of Patent: Oct. 4, 2011

(54) SERVER AND SYSTEM FOR TRANSMITTING CERTIFICATE STORED IN FIXED TERMINAL TO MOBILE TERMINAL AND METHOD USING THE SAME

(75) Inventors: Seung-Hyun Kim, Daegu (KR);
Jong-Hyouk Noh, Daejeon (KR);
Sang-Rae Cho, Daejeon (KR);
Yeong-Sub Cho, Daejeon (KR);
Dae-Seon Choi, Daejeon (KR);
Seung-Hun Jin, Daejeon (KR); Kyo Il Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1005 days.

(21) Appl. No.: 11/934,620

(22) Filed: Nov. 2, 2007

(65) Prior Publication Data
US 2008/0126797 A1 May 29, 2008

(30) Foreign Application Priority Data

Nov. 23, 2006 (KR) .................. 10-2006-0116595
May 11, 2007 (KR) .................. 10-2007-0046225

(51) Int. Cl.
*G06F 21/00* (2006.01)
*H04L 9/32* (2006.01)
*H04K 1/00* (2006.01)
(52) U.S. Cl. ................ 713/175; 713/156; 726/10
(58) Field of Classification Search .............. None
See application file for complete search history.

(56) References Cited

U.S. PATENT DOCUMENTS

| 7,004,388 | B2* | 2/2006 | Kohta ............................ 235/381 |
| 7,016,666 | B2* | 3/2006 | Lauper et al. ................... 455/411 |
| 7,398,396 | B2* | 7/2008 | Arditi et al. .................... 713/176 |
| 7,543,141 | B2* | 6/2009 | Jeon et al. ...................... 713/156 |
| 7,581,102 | B2* | 8/2009 | Yasuda .......................... 713/175 |
| 7,941,843 | B2* | 5/2011 | Iwama et al. .................... 726/15 |
| 2002/0056039 | A1* | 5/2002 | Lim et al. ...................... 713/156 |

(Continued)

FOREIGN PATENT DOCUMENTS

KR 10-2004-0082362 9/2004

(Continued)

OTHER PUBLICATIONS

Korean Office Action for Application No. 10-2007-0046225, dated Nov. 17, 2008.

*Primary Examiner* — Christopher Revak
(74) *Attorney, Agent, or Firm* — Nelson Mullins Riley & Scarborough LLP; EuiHoon Lee

(57) ABSTRACT

Provided is a certificate transmission server transmitting a certificate stored in a fixed terminal to a mobile terminal, a system including the same, and a method using the same. The method includes forming a security channel to the mobile terminal and performing authentication of the mobile terminal, forming a security channel to the fixed terminal and performing authentication of the fixed terminal, and if the authentication of the mobile terminal and the fixed terminal is successful, receiving the certificate from the fixed terminal and transmitting the certificate to the mobile terminal. Accordingly, authentication of a mobile terminal and a fixed terminal can be performed by a certificate transmission server, and the certificate can be transmitted by establishing a safe communication channel.

12 Claims, 4 Drawing Sheets

U.S. PATENT DOCUMENTS

| | | | |
|---|---|---|---|
| 2003/0110374 A1* | 6/2003 | Yamamoto et al. | 713/155 |
| 2005/0100166 A1* | 5/2005 | Smetters et al. | 380/277 |
| 2005/0144439 A1* | 6/2005 | Park et al. | 713/155 |
| 2006/0075222 A1* | 4/2006 | Moloney et al. | 713/156 |
| 2006/0095384 A1* | 5/2006 | Ishii | 705/64 |
| 2006/0143458 A1* | 6/2006 | Tie et al. | 713/176 |
| 2006/0171540 A1* | 8/2006 | Lee et al. | 380/277 |
| 2007/0260877 A1* | 11/2007 | Adams et al. | 713/156 |
| 2008/0045218 A1* | 2/2008 | Okochi et al. | 455/436 |
| 2009/0037728 A1* | 2/2009 | Kamikura | 713/156 |
| 2009/0150979 A1* | 6/2009 | Fujino | 726/4 |
| 2010/0109835 A1* | 5/2010 | Alrabady et al. | 340/5.2 |
| 2010/0125737 A1* | 5/2010 | Kang | 713/176 |

FOREIGN PATENT DOCUMENTS

KR  10-2007-0023309  2/2007

* cited by examiner

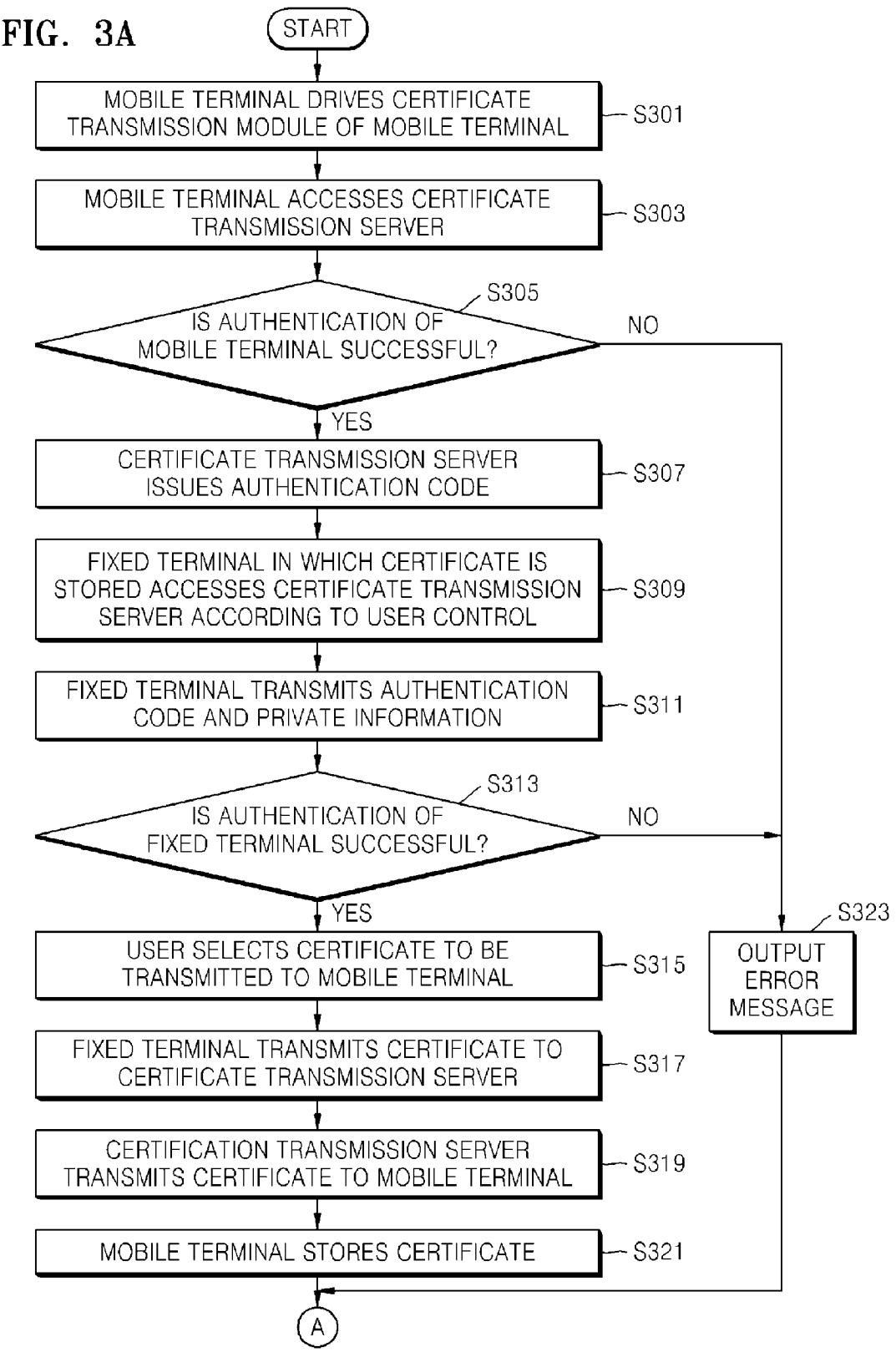

SERVER AND SYSTEM FOR TRANSMITTING CERTIFICATE STORED IN FIXED TERMINAL TO MOBILE TERMINAL AND METHOD USING THE SAME

CROSS-REFERENCE TO RELATED PATENT APPLICATION

This application claims the benefit of Korean Patent Application No. 10-2006-0116595, filed on Nov. 23, 2006, and Korean Patent Application No. 10-2007-0046225, filed on May 11, 2007, in the Korean Intellectual Property Office, the disclosure of which is incorporated herein in its entirety by reference.

BACKGROUND OF THE INVENTION

1. Field of the Invention

The present invention relates to a server having the ability to safely transmit a user's certificate to a mobile terminal in order to use the certificate in mobile terminal-based environment, a communication system to which the server is applied, and a method using the same.

This work was supported by the IT R&D program of MIC/IITA [2005-S-060-02, Development of Universal Security Service Platform Technology for Protecting e-Identity].

2. Description of the Related Art

Nowadays, the use of wireless Internet with mobile terminals is rapidly increasing, and wireless Internet using habits of mobile terminal users are diversifying. However, compared to using Internet with fixed terminals such as a Personal Computer (PC), a complex process is required to use Internet with mobile terminals. In addition, due to problems in a mobile terminal's performance compared to a PC's performance, it is difficult to provide a sufficient level of security while using Internet with mobile terminals. In the past, Wireless Public Key Infrastructure (WPKI) suitable for a processing rate of mobile terminals was suggested. However, recently, with an increase of the performance of mobile terminals, a method of carrying a wired certificate has been discussed to provide a sufficient level of security.

Korean Patent Publication No. 10-2004-0082362 disclosed in Sep. 24, 2004 titled "authorized certificate management method and user authentication method using mobile terminal" relates to a method of managing an authorized certificate by using a mobile terminal as a storage medium, by which an authorized certificate stored in a user's network terminal is downloaded to the mobile terminal, and if the authorized certificate is necessary, the authorized certificate stored in the mobile terminal is transmitted for an authentication process. However, in order to drive a certificate management module of the mobile terminal and transmit the authorized certificate to a certificate management server, a Short Message Service (SMS) including a callback Uniform Resource Locator (URL) is required, and the mobile terminal simply acts as a certificate storage medium. In addition, since the certificate management server can read all communications between the mobile terminal and the network terminal, the certificate management server may be used for a malicious purpose.

SUMMARY OF THE INVENTION

The present invention provides a server having the ability to safely transmit a certificate stored in a fixed terminal, such as a Personal Computer (PC) of a user, to a mobile terminal in a communication environment in which the mobile terminal is used, a communication system including the server, and a method using the same, wherein the server provides a safe process so that important information, such as a private key of the user, cannot be illegitimately obtained.

According to an aspect of the present invention, there is provided a method of transmitting a certificate stored in a fixed terminal to a mobile terminal by a certificate server, the method comprising: forming a security channel to the mobile terminal and performing authentication of the mobile terminal; forming a security channel to the fixed terminal and performing authentication of the fixed terminal; and if the authentication of the mobile terminal and the fixed terminal is successful, receiving the certificate from the fixed terminal and transmitting the certificate to the mobile terminal.

According to another aspect of the present invention, there is provided a method of receiving a certificate stored in a fixed terminal by a mobile terminal, the method comprising: connecting to a designated certificate transmission server; transmitting private information of a user which uses the mobile terminal in order to receive authentication of the user performed by the certificate transmission server; and if the authentication of the user is successful, receiving the certificate from the certificate transmission server and storing it.

According to another aspect of the present invention, there is provided a certificate transmission server for transmitting a certificate stored in a fixed terminal to a mobile terminal, the certificate transmission server comprising: a first authentication unit receiving private information of a user which uses the mobile terminal and is able to have access to the fixed terminal from the mobile terminal, performing authentication of the mobile terminal, and forming a security channel to the mobile terminal; a second authentication unit performing authentication of the fixed terminal based on the private information of the user and an authentication code; an authentication code generator generating an authentication code exclusive to the mobile terminal if the authentication of the mobile terminal is successful and transmitting the authentication code to the mobile terminal; and a certificate transceiver receiving the certificate from the fixed terminal and transmitting it to the mobile terminal if the authentication of the mobile terminal and the fixed terminal is successful.

According to another aspect of the present invention, there is provided a system for transmitting a certificate stored in a fixed terminal to a mobile terminal, the system comprising: the mobile terminal; the fixed terminal transmitting a certificate selected by a user which uses the mobile terminal is able to have access to the fixed terminal from among certificates stored therein to a certificate transmission server; and the certificate transmission server performing authentication of the mobile terminal and the fixed terminal and transmitting the certificate received from the fixed terminal to the mobile terminal.

BRIEF DESCRIPTION OF THE DRAWINGS

The above and other features and advantages of the present invention will become more apparent by describing in detail exemplary embodiments thereof with reference to the attached drawings in which:

FIGS. 3A and 3B are flowcharts of a method of transmitting a certificate stored in a fixed terminal and finally storing a private key by driving a certificate transmission module of a mobile terminal in a system including the certificate transmission server illustrated in FIGS. 1 and 2, according to an embodiment of the present invention.

DETAILED DESCRIPTION OF THE INVENTION

The present invention will be described in detail by explaining preferred embodiments of the invention with reference to the attached drawings.

Figure 1:
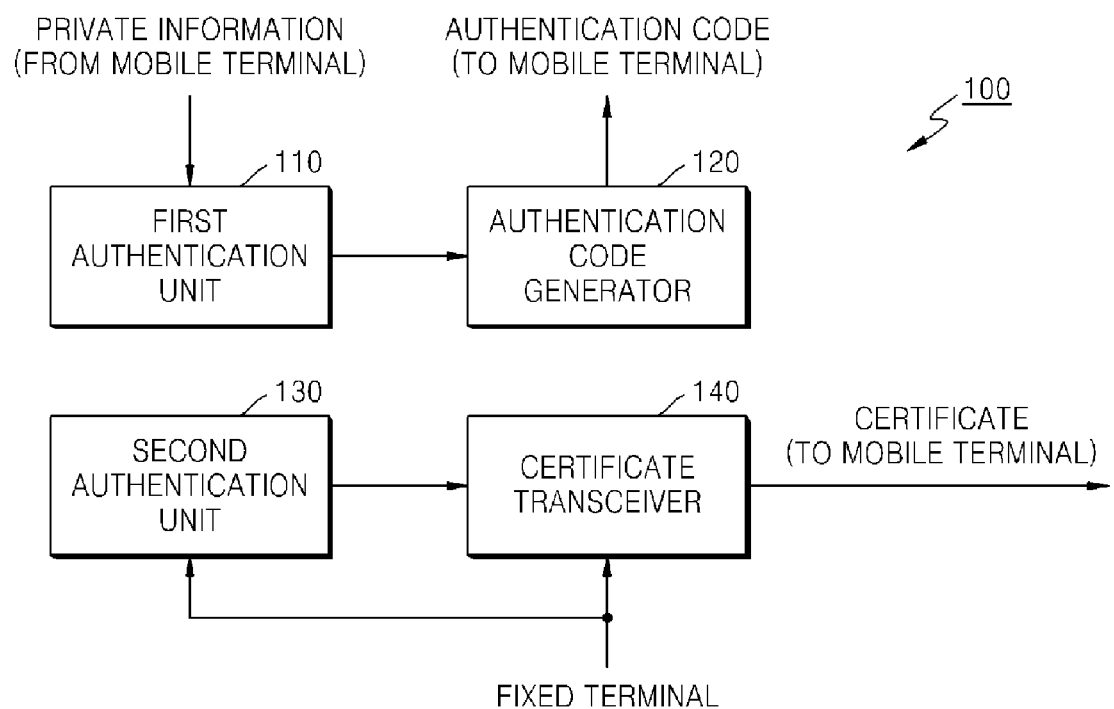
FIG. 1 is a block diagram of a certificate transmission server for transmitting a certificate stored in a fixed terminal to a mobile terminal according to an embodiment of the present invention.

FIG. 1 is a block diagram of a certificate transmission server 100 for transmitting a certificate stored in a fixed terminal to a mobile terminal according to an embodiment of the present invention.

Referring to FIG. 1, the certificate transmission server 100 includes a first authentication unit 110, an authentication code generator 120, a second authentication unit 130, and a certificate transceiver 140.

The first authentication unit 110 receives private information of a mobile terminal user (hereinafter, user) from the mobile terminal, performs authentication of the mobile terminal using the private information, and forms a security channel to the mobile terminal if the authentication succeeds. Since the description of the security channel will be understood by those of ordinary skill in the art, the security channel is not described.

The authentication code generator 120 generates an authentication code for authentication of the fixed terminal of the user based on the private information of the user.

The second authentication unit 130 performs authentication of the fixed terminal for which the user has the access right, i.e. the fixed terminal which stores a certificate for the user, using the private information of the user and an authentication code and forms a security channel to the fixed terminal.

If the authentication of the fixed terminal succeeds based on the authentication code which is generated by the authentication code generator 120 and received from the fixed terminal, the certificate transceiver 140 receives the certificate from the fixed terminal and transmits it to the mobile terminal. In this case, the certificate may be one selected by the user from among certificates stored in the fixed terminal.

Figure 2:
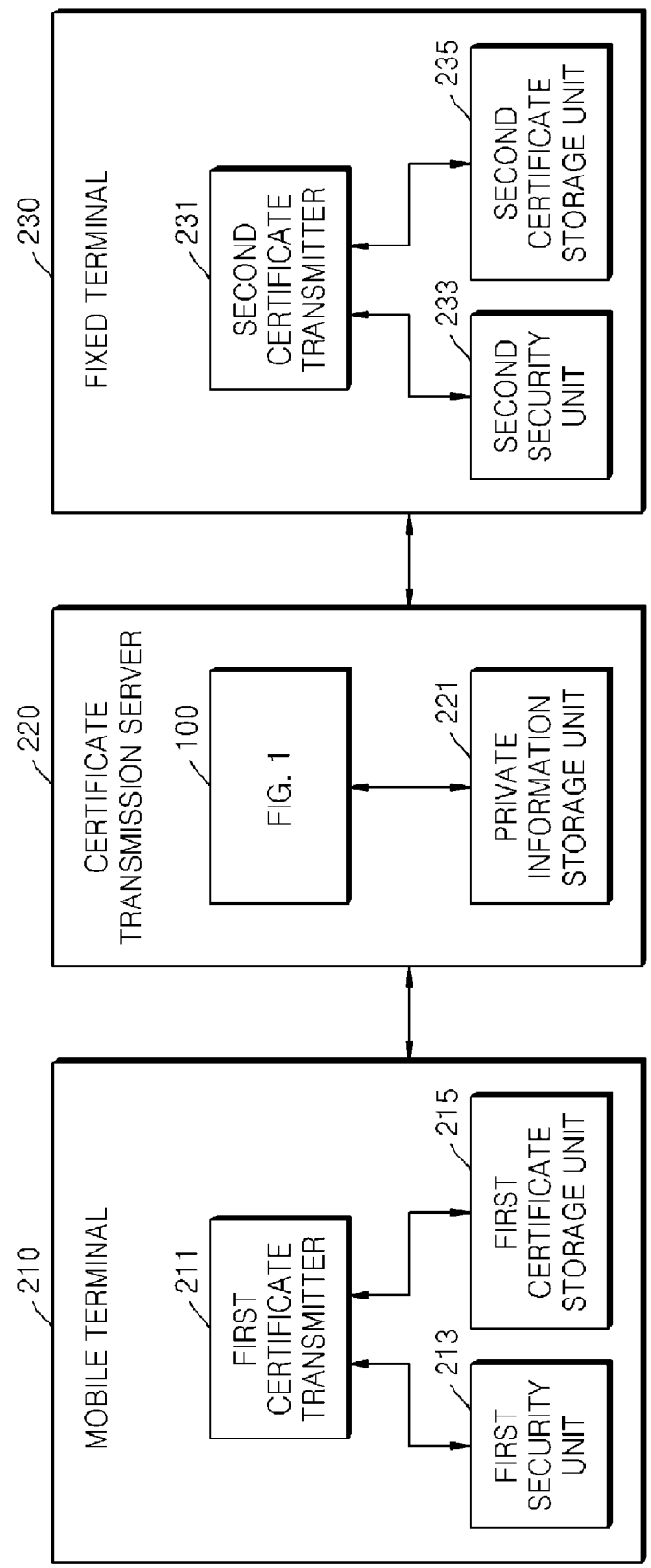
FIG. 2 is a configuration of mobile terminal-based environment and system including the certificate transmission server illustrated in FIG. 1, according to an embodiment of the present invention.

FIG. 2 is a configuration of mobile-based terminal environment and system including the certificate transmission server 100 illustrated in FIG. 1, according to an embodiment of the present invention. Operations of a mobile terminal and a fixed terminal associated with a certificate transmission server 220 will now be described.

Referring to FIG. 2, although the certificate transmission server 220 has a configuration in which a private information storage unit 221 is added to the certificate transmission server illustrated in FIG. 1, it can be considered that the same operation as that of the certificate transmission server illustrated in FIG. 1 is performed. A certificate transmission system transmitting a certificate stored in a fixed terminal to a mobile terminal according to an embodiment of the present invention includes a mobile terminal 210, the certificate transmission server 220, and a fixed terminal 230. The mobile terminal 210 includes a first certificate transmitter 211, a first security unit 213, and a first certificate storage unit 215, and has functions performed by conventional mobile terminals. The certificate transmission server 220 operates in the same way as that of the certificate transmission server illustrated in FIG. 1. The fixed terminal 230 includes a second certificate transmitter 231, a second security unit 233, and a second certificate storage unit 235.

The first certificate transmitter 211 of the mobile terminal 210 may operate according to a selection of a user. In addition, the first certificate transmitter 211 receives a certificate stored in the fixed terminal 230 for which the user has the access right and stores it in the first certificate storage unit 215 through the certificate transmission server 220. In order to communicate with the certificate transmission server 220 in a safe method, the first certificate transmitter 211 establishes a reliable security channel through the first security unit 213.

A certificate transmission function of the certificate transmission server 220 is achieved through the certificate transceiver 140 as described in FIG. 1, which processes communication with the first certificate transmitter 211 of the mobile terminal 210 and the second certificate transmitter 231 of the fixed terminal 230. Before the communication begins, in order to confirm identity of each terminal and establish a reliable relationship, the first authentication unit 110 performs authentication of the mobile terminal 210, and the second authentication unit 130 performs authentication of the fixed terminal 230. For the authentication, information on users, fixed terminals, and mobile terminals, which is previously stored in the private information storage unit 221, is used. After the authentication succeeds, the certificate transmission server 220 generates an authentication code exclusive to the mobile terminal 210 and issues the authentication code to the mobile terminal 210 so that the authentication code is used for the authentication of the fixed terminal 230. A method of using the authentication code will be described with reference to FIG. 3 later. The authentication code is generated with a series of arbitrary numbers and/or characters so that it is difficult to guess the authentication code.

The second certificate transmitter 231 of the fixed terminal 230 safely accesses the second authentication unit 130 of the certificate transmission server 220 via the second security unit 233 and the second authentication unit 130 performs authentication of the fixed terminal 230 by receiving the authentication code and private information from the fixed terminal 230. If the authentication of the fixed terminal 230 succeeds, the certificate of the user stored in the second certificate storage unit 235 is stored in the first certificate storage unit 215 of the mobile terminal 210 via the certificate transmission server 220.

Figure 3B:
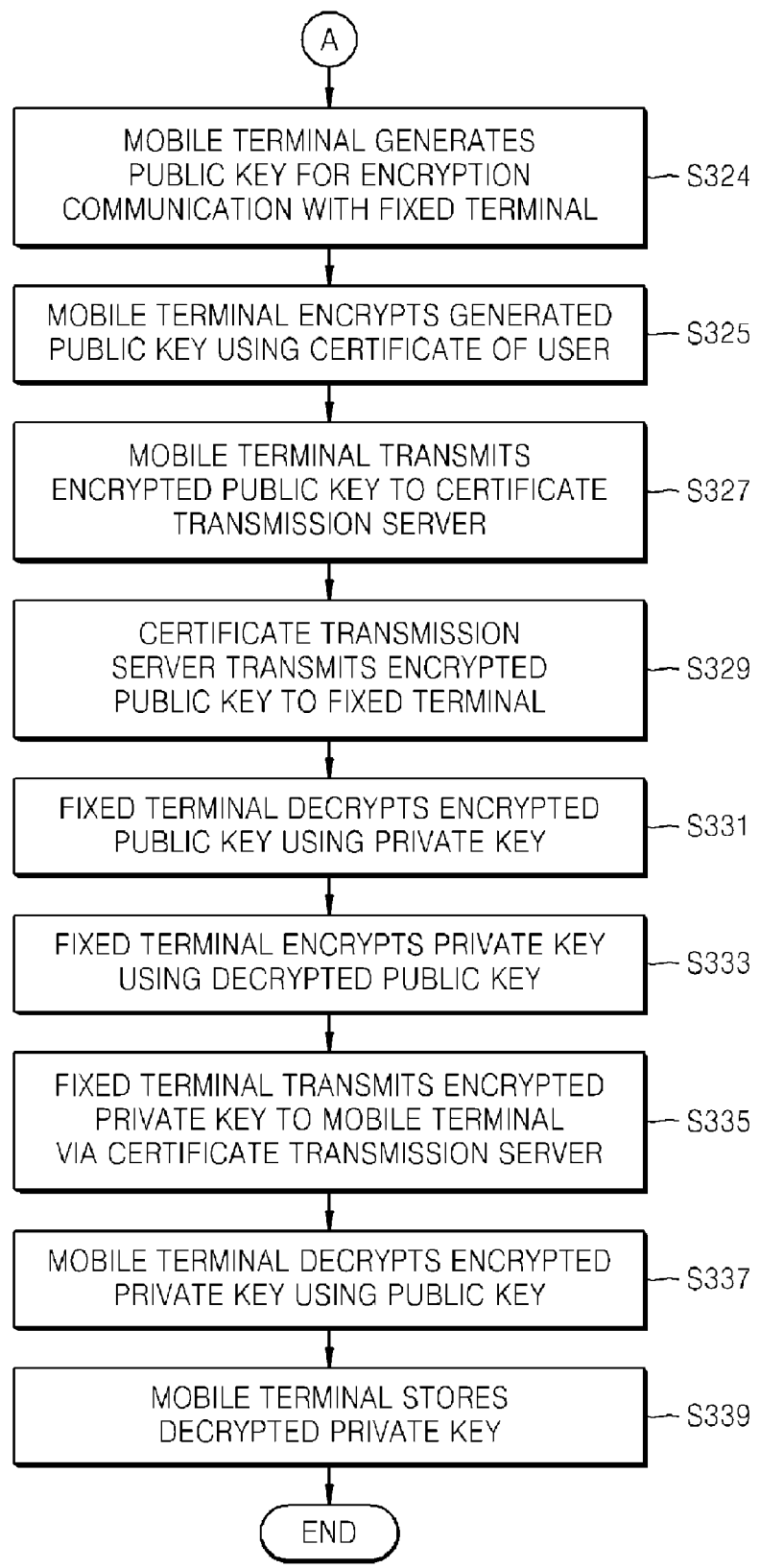

FIGS. 3A and 3B are flowcharts of a method of transmitting a certificate stored in a fixed terminal to a mobile terminal and finally storing a private key by driving a certificate transmission module of the mobile terminal in a system including the certificate transmission server illustrated in FIG. 1 or 2, according to an embodiment of the present invention.

Referring to FIGS. 3A and 3B, this process begins when the first certificate transmitter 211 of the mobile terminal 210 is driven in operation S301. The first certificate transmitter 211 accesses the certificate transmission server 220 in operation S303 using an address previously defined by a network manager. The certificate transmission server 220 performs authentication of the mobile terminal 210 in operation S305. If the authentication of the mobile terminal is successful, the certificate transmission server 220 issues an authentication code to the mobile terminal 210 in operation S307. If the authentication of the mobile terminal fails, the certificate transmission server 220 outputs an error message in operation S323, and the process illustrated in FIGS. 3A and 3B ends. A user accesses the certificate transmission server 220 in operation S309 using the fixed terminal 230 in which a certificate of the user is stored. In operation S311, for the authentication of the user, i.e. the authentication of the fixed terminal 230 to be successfully performed by the certificate transmission server 220, the user must provide private information of the user and the authentication code received in operation S307. If the certificate transmission server 220 fails to perform the authentication of the fixed terminal 230 in operation S313, the certificate transmission server 220 outputs an error message in operation S323, and the process ends. If the authentication of the fixed terminal 230 is successful, the user selects a certificate to be transmitted to the mobile terminal 210 from among certificates stored in the fixed terminal 230 in operation S315. The selected certificate of the user is transmitted to the certificate transmission server 220 in operation S317, and the certificate transmission server 220 transmits the certificate to the mobile terminal 210 in operation S319. The mobile terminal 210 receives and stores the certificate of the user in operation S321. A process related a public key and a private key will now be described in detail with reference to FIG. 3B.

The mobile terminal 210 generates a public key for encryption communication with the fixed terminal 230 in operation S324 in a state where the certificate of the user is stored through the above-described process. The mobile terminal 210 encrypts the generated public key using the stored certificate of the user in operation S325. The mobile terminal 210 transmits the encrypted public key to the certificate transmission server 220 in operation S327 after the encryption is performed. The certificate transmission server 220 transmits the encrypted public key to the fixed terminal 230 in operation S329.

The fixed terminal 230 decrypts the encrypted public key using a private key in operation S331. The fixed terminal 230 encrypts the private key using the decrypted public key in operation S333 and transmits the encrypted private key to the certificate transmission server 220. The certificate transmission server 220 transmits the encrypted private key to the mobile terminal 210 in operation S335. The mobile terminal 210 decrypts the encrypted private key using the public key in operation S337 and stores the decrypted private key in operation S339. Then, the entire process ends.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to the present invention, authentication of a mobile terminal and a fixed terminal can be performed by a certificate transmission server by transmitting a certificate of a user to the mobile terminal for safe transaction in mobile terminal-based environment, and the certificate can be transmitted by establishing a safe communication channel.

In addition, since identity of a person which executes a transaction can be confirmed without the limitation of a terminal location and a non-repudiation function is provided by using a certificate transmitted to a mobile terminal, a safe mobile electronic transaction service can be provided.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting a certificate stored in a fixed terminal to a mobile terminal by a certificate transmission server, the method comprising:
   (a) forming a security channel to the mobile terminal and performing authentication of the mobile terminal;
   (b) forming a security channel to the fixed terminal and performing authentication of the fixed terminal; and
   (c) if the authentication of the mobile terminal and the fixed terminal is successful, receiving the certificate directly from the fixed terminal and transmitting the certificate to the mobile terminal,
   wherein for the authentication of the fixed terminal, the fixed terminal transmits to the certificate transmission server the same authentication code as the certificate transmission server has issued to the mobile terminal.

2. The method of claim 1, wherein (a) comprises:
   receiving private information of a user which uses the mobile terminal and is able to have access to the fixed terminal from the mobile terminal;
   verifying the private information, and if the authentication of the mobile terminal is successful, generating an authentication code for the mobile terminal; and
   transmitting the authentication code to the mobile terminal.

3. The method of claim 1, wherein (b) comprises receiving an authentication code and private information from the fixed terminal and performing the authentication of the fixed terminal.

4. The method of claim 1, wherein the certificate received from the fixed terminal and transmitted to the mobile terminal is selected by a user which uses the mobile terminal and is able to have access to the fixed terminal from among certificates stored in the fixed terminal.

5. The method of claim 1, further comprising:
   the mobile terminal generating a public key for encryption communication with the fixed terminal after the transmitting of the certificate to the mobile terminal is occurred;
   the mobile terminal encrypting the public key using the certificate;
   the certificate transmission server receiving the encrypted public key from the mobile terminal and transmitting it to the fixed terminal;
   the fixed terminal decrypting the encrypted public key using a private key;
   the fixed terminal encrypting the private key using the decrypted public key;
   the certificate transmission server receiving the encrypted private key from the fixed terminal and transmitting it to the mobile terminal; and
   the mobile terminal decrypting the encrypted private key using the public key and storing the decrypted private key.

6. A method of receiving a certificate stored in a fixed terminal by a mobile terminal, the method comprising:
   (a) connecting to a designated certificate transmission server;

(b) transmitting private information of a user which uses the mobile terminal in order to receive authentication of the user performed by the certificate transmission server; and (c) if the authentication of the user is successful, receiving the certificate from the certificate transmission server which has received the certificate directly from the fixed terminal, wherein for the authentication of the fixed terminal, the fixed terminal transmits to the certificate transmission server the same authentication code as the certificate transmission server has issued to the mobile terminal.

7. The method of claim 6, wherein (a) comprises accessing the certificate transmission server using one of certificate transmission server addresses stored in the mobile terminal or a certificate transmission server address directly input by a user.

8. The method of claim 6, wherein (c) comprises receiving and storing an authentication code to be used for authentication of the fixed terminal from the certificate transmission server.

9. A certificate transmission server for transmitting a certificate stored in a fixed terminal to a mobile terminal, the certificate transmission server comprising:

a first authentication unit receiving private information of a user which uses the mobile terminal and is able to have access to the fixed terminal from the mobile terminal, performing authentication of the mobile terminal, and forming a security channel to the mobile terminal;

a second authentication unit performing authentication of the fixed terminal based on the private information of the user and an authentication code;

an authentication code generator generating an authentication code exclusive to the mobile terminal if the authentication of the mobile terminal is successful and transmitting the authentication code to the mobile terminal; and a certificate transceiver receiving the certificate directly from the fixed terminal and transmitting the certificate to the mobile terminal if the authentication of the mobile terminal and the fixed terminal is successful, wherein for the authentication of the fixed terminal, the fixed terminal transmits to the certificate transmission server the same authentication code as the certificate transmission server has issued to the mobile terminal.

10. The certificate transmission server of claim 9, wherein the certificate received from the fixed terminal and transmitted to the mobile terminal is selected by the user from among certificates stored in the fixed terminal.

11. A system for transmitting a certificate stored in a fixed terminal to a mobile terminal, the system comprising:

the mobile terminal;

the fixed terminal transmitting a certificate selected by a user which uses the mobile terminal is able to have access to the fixed terminal from among certificates stored therein to a certificate transmission server; and the certificate transmission server performing authentication of the mobile terminal and the fixed terminal and transmitting the certificate received directly from the fixed terminal to the mobile terminal, wherein for the authentication of the fixed terminal, the fixed terminal transmits to the certificate transmission server the same authentication code as the certificate transmission server has issued to the mobile terminal.

12. The system of claim 11, wherein the certificate transmission server comprises:

a first authentication unit receiving private information of the user from the mobile terminal, performing authentication of the mobile terminal, and forming a security channel to the mobile terminal;

a second authentication unit performing authentication of the fixed terminal based on the private information of the user and an authentication code;

an authentication code generator generating an authentication code exclusive to the mobile terminal if the authentication of the mobile terminal is successful and transmitting the authentication code to the mobile terminal; and a certificate transceiver receiving the certificate from the fixed terminal and transmitting it to the mobile terminal if the authentication of the mobile terminal and the fixed terminal is successful.

* * * * *